US006557757B1

(12) United States Patent
Peebles

(10) Patent No.: US 6,557,757 B1
(45) Date of Patent: May 6, 2003

(54) MEDIA CASSETTE FOR SELF-SERVICE TERMINAL

(75) Inventor: John A. Peebles, Dundee (GB)

(73) Assignee: NCR Corporation, Dayton, OH (US)

( * ) Notice: Subject to any disclaimer, the term of this patent is extended or adjusted under 35 U.S.C. 154(b) by 8 days.

(21) Appl. No.: 09/679,585

(22) Filed: Oct. 4, 2000

(30) Foreign Application Priority Data

Oct. 29, 1999 (GB) ............................................ 9925552

(51) Int. Cl.[7] ................................................ G06F 17/60

(52) U.S. Cl. ........................ 235/379; 235/479; 235/486

(58) Field of Search ................................ 235/479, 486, 235/379; 902/8, 9, 13, 14, 17; 705/40, 42, 43; 271/162, 163, 171, 220, 221, 145

(56) References Cited

U.S. PATENT DOCUMENTS

| | | | | | |
|---|---|---|---|---|---|
| 3,598,400 | A | * | 8/1971 | Nelson | 271/150 |
| 4,032,136 | A | * | 6/1977 | Komaba et al. | 271/127 |
| 4,200,276 | A | * | 4/1980 | Marschke | 271/202 |
| 4,283,097 | A | * | 8/1981 | Lundblad | 312/223 |
| 4,337,393 | A | * | 6/1982 | Hilton | 235/487 |
| 4,438,704 | A | * | 3/1984 | Hutcheon | 109/44 |
| 4,529,119 | A | * | 7/1985 | Granzow et al. | 232/43.3 |
| 4,571,489 | A | * | 2/1986 | Watanabe | 235/379 |
| 4,580,422 | A | * | 4/1986 | Wills | 70/63 |
| 4,593,895 | A | * | 6/1986 | Myers et al. | 271/148 |
| 4,607,834 | A | * | 8/1986 | Dastin | 271/171 |
| 4,655,368 | A | * | 4/1987 | Bateman et al. | 221/4 |
| 4,659,008 | A | * | 4/1987 | Howett et al. | 232/43.3 |
| 4,704,061 | A | * | 11/1987 | Peebles | 414/405 |
| 4,745,266 | A | * | 5/1988 | Miura | 221/129 |
| 4,760,923 | A | * | 8/1988 | Lundblad et al. | 209/534 |
| 4,786,042 | A | * | 11/1988 | Stemmle | 271/127 |
| 4,816,652 | A | * | 3/1989 | Wildgoose et al. | 235/379 |
| 4,871,085 | A | | 10/1989 | Graef et al. | 221/4 |
| 4,980,543 | A | * | 12/1990 | Hara et al. | 235/379 |
| 5,172,903 | A | | 12/1992 | Haneda et al. | 271/171 |
| 5,573,236 | A | * | 11/1996 | Petocchi et al. | 250/214 PR |
| 5,574,551 | A | * | 11/1996 | Kazakoff | 271/171 |
| 5,632,477 | A | * | 5/1997 | Morinaga | 271/127 |
| 5,647,585 | A | * | 7/1997 | Cheong | 271/171 |
| 6,241,240 | B1 | * | 6/2001 | Bukhman | 271/181 |
| 6,244,504 | B1 | * | 6/2001 | Holland-Letz | 232/15 |
| 6,286,716 | B2 | * | 9/2001 | Izawa et al. | 221/197 |
| 6,402,025 | B1 | * | 6/2002 | Shepherd et al. | 235/379 |

FOREIGN PATENT DOCUMENTS

| | | | | |
|---|---|---|---|---|
| EP | 0555885 | | 8/1993 | |
| EP | 0827117 A2 | * | 3/1998 | |
| GB | 1419508 | | 12/1975 | |
| GB | 2089771 | | 6/1982 | |
| JP | 01256461 A | * | 10/1989 | B65H/29/46 |

* cited by examiner

*Primary Examiner*—Michael G. Lee
*Assistant Examiner*—Uyen-Chau Le
(74) *Attorney, Agent, or Firm*—Priest & Goldstein PLLC

(57) ABSTRACT

A media cassette (10) for a self-service terminal (SST) comprises a body (20) for receiving media to be dispensed in the form of a bundle of media (12) having end faces and side faces. At least one movable guide member (16, 17, 18, 19) is provided for locating the media within the body (20) and for engaging a respective side face of the media bundle (12). The guide member (16, 17, 18, 19) is urged towards the respective side face of the media bundle (12).

18 Claims, 3 Drawing Sheets

MEDIA CASSETTE FOR SELF-SERVICE TERMINAL

BACKGROUND OF THE INVENTION

This invention relates to a self-service terminal (SST), such as an automated teller machine (ATM), and in particular to media containers,or cassettes as provided in such SSTs and which are used to store and transport media to be dispensed from SSTs.

Self-service terminals (SSTs), particularly automated teller machines (ATMs), are often used to dispense valuable media, such as banknotes. Conventionally, banknotes of different denominations are stored within an ATM in respective currency cassettes, from which notes are retrieved or "picked" as required for dispensing. The cassettes are filled at a secure central location and then distributed and fitted in the ATMs by authorized personnel. Empty and partially filled cassettes are retrieved from the ATMs and returned to the secure central location for auditing and refilling.

A typical currency cassette will store a bundle or stack of notes up to 300 mm long. A sprung pusher plate engaging an end face of the bundle urges the notes towards a roller door at one end of the cassette, the door being opened when the cassette is pushed into position in an ATM by engagement with a pair of locating prongs. The note bundle rests on tracks provided in a cassette body and is located within the body by various guides: the cassette body includes "width" restraining guides for locating the sides of the bundle, and the removable cassette lid includes "height" restraining guides for locating the upper face of the bundle. Cassettes tend to be produced in a limited number of standard sizes, based on a selected nominal currency, typically US dollar bills. Accordingly, to accommodate notes of other denominations, it is necessary that the guides are adjustable, and cassettes are therefore provided with adjustable guide mountings which may be set to suit a particular currency denomination. ATM suppliers will normally provide currency cassettes to their customers together with tables indicating the correct settings for the guide mountings for particular currencies and denominations; the customers will set up the cassettes in accordance with their own particular requirements, guided by the tables. The correct adjustment and fitting of the guides requires a degree of skill and dexterity and it is not uncommon for guides to be fitted incorrectly, which will affect the operation of ATMs fitted with the cassettes. For example, if the guides provide insufficient clearance, the cassette will be difficult to load with notes and notes may stick or jam in the cassette. Conversely, if the guides provide too much clearance, the notes may move around within the cassette during handling and transport to such an extent that the integrity of the note bundle may be lost and notes will not dispense correctly.

A further difficulty occurs in cassettes which are "overfilled", that is an operator has placed too many notes in a cassette, with the result that the notes are packed too tightly to dispense properly.

These problems will tend not to be apparent on visual inspection of a filled currency cassette, and as cassettes are sealed for security reasons following filling any problems will only become apparent after the currency cassette has been inserted in an ATM and the machine has attempted to pick notes from the cassette. In many cases the resulting difficulties will result in the ATM closing down, and require a service engineer to be called out. Security requirements are often such that any "faulty" cassettes have to be returned to a central secure location for opening and checking, such that there may be a considerable delay in identifying the source of the fault and returning the ATM to service.

SUMMARY OF THE INVENTION

It is among the objectives of embodiments of the various aspects of this invention to provide self-service terminals (SSTs) and currency cassettes which obviate and mitigate at least some of these difficulties.

According to one aspect of the present invention there is provided a media cassette for a self-service terminal (SST), the cassette comprising: a body for receiving media to be dispensed in the form of a bundle of media having end faces and side faces; at least one movable guide member for locating the media within the body and for engaging a respective side face of the media bundle; and means for urging the at least one guide member towards the respective side face of the media bundle.

According to another aspect of the present invention there is provided a method of locating media in a cassette for storing media to be dispensed from a self-service terminal (SST), the method comprising: positioning a bundle of media in a body for receiving media to be dispensed; and urging at least one movable guide member towards a respective side face of the media bundle to locate the bundle within the body.

These aspects of the present invention allows cassettes to be provided to accommodate media of different dimensions, without requiring the guide members to be specifically set for media of a particular size. Accordingly, in the case of currency cassettes for automated teller machines (ATMs), ATM suppliers may supply a single form of currency cassette which will accommodate a range of currencies and denominations without requiring the guides to be specifically set.

Preferably, the cassette includes width guides for engaging the sides of the media bundle, that is the guides are intended to engage the side edges of the media. Only one of the guides may be movable, however it is preferred that the width guides are coupled or otherwise operatively associated such that a transverse movement of one guide produces a corresponding movement of the other guide, thus facilitating centralizing of a bundle of media in the cassette body. The guides may be coupled mechanically via a lever or gear system, or may be associated electronically, for example by appropriate guide position sensors, comparators and guide moving motors.

Preferably also, the cassette includes a height guide for engaging an upper face of the media bundle, that is the guide is intended to engage the upper edges of the media. The height guide may be mounted to a lid or cover for the cassette body.

Preferably also, the at least one guide is selectively lockable in position. This may be useful during transportation and handling of the cassette, when movement of the guide might permit undesirable movement of the media. The guide may be manually lockable or may be automatically lockable on, for example, fitting a lid on the cassette body or removing the cassette body from a filling jig or station. The automatic locking may be achieved by mechanical interaction or by electrical or electronic means, for example by operation of a solenoid to actuate a lock or key.

Preferably also, the at least one guide is selectively retractable to provide a working clearance to facilitate media dispensing; it may be desirable to have little or no clearance between the guide and the media bundle during one or more of filling, handling and transport of the cassette, however when dispensing it is desirable to provide clearance to permit substantially unrestrained movement of the bundle towards the pick end of the cassette. The clearance may be provided by a manual adjustment of the guide prior to placing the cassette in the SST, but is preferably provided automatically on insertion of the cassette into the SST. The clearance may be provided by a mechanical interaction between an element of the SST and the guide, or may be obtained by the insertion of the cassette in the SST closing or opening a switch or otherwise changing an electrical state in an appropriate device to energize or actuate a motor, actuate a solenoid or the like to retract the guide a selected distance.

The means for urging the at least one guide member towards the respective side face of the media bundle preferably incorporates one or more springs, typically a compression spring, but may incorporate some other form of means, such as a volume of resilient material, an arrangement of magnets, a motor, a solenoid, or a mass coupled to the guides such that gravity acting on the mass tends to urge the guide member in the desired direction.

According to a further aspect of the present invention there is provided a media cassette for a self-service terminal (SST), the cassette comprising: a body for receiving media to be dispensed in the form of a bundle of media; and at least one movable guide member for locating the media within the body and for engaging a respective side face of the media bundle, the at least one guide member being biased towards the respective side face of the media bundle.

According to a still further aspect of the present invention there is provided a media cassette for a self-service terminal (SST), the cassette comprising: a body for receiving media to be dispensed in the form of a bundle of media; and at least one movable guide member for locating the media within the body and for engaging a respective side face of the media bundle, the at least one guide member being biased towards the respective side face of the media bundle, and the at least one guide member being selectively lockable within the body.

According to another aspect of the invention there is provided a method of locating media in a cassette for storing media to be dispensed from a self-service terminal (SST), the method comprising:

positioning a bundle of media in a body for receiving media to be dispensed;

urging at least one movable guide member toward the media bundle to locate the bundle within the body; and then locking the at least one movable guide member with respect to the body.

According to a yet further aspect of the present invention there is provided a media cassette for a self-service terminal (SST), the cassette comprising: a body for receiving media to be dispensed in the form of a bundle of media; and at least one movable guide member for locating the media within the body and for engaging the media bundle, the at least one guide member being biased towards the media bundle and into contact with the bundle, and the at least one guide member being selectively retractable to provide clearance between the guide member and the bundle.

According to another aspect of the invention there is provided a method of locating media in a cassette for storing media to be dispensed from a self-service terminal (SST), the method comprising:

positioning a bundle of media in a body for receiving media to be dispensed;

urging at least one movable guide member toward the media bundle to locate the bundle within the body; and then locating the body in an SST and retracting the at least one movable guide relative to the bundle to provide clearance therebetween.

According to another aspect of the present invention there is provided a media cassette for a self-service terminal (SST), the cassette comprising: a body for receiving media to be dispensed and defining an area to receive a bundle of media; and a member mounted to the body and movable between a first position in which the member restricts the length of the media-receiving area to a first dimension during filling of the body, the first dimension corresponding to a predetermined maximum length of media bundle, and a second position in which the member permits the length of the media-receiving area to be extended to a greater second dimension and permits longitudinal expansion of a media bundle therein.

According to a still further aspect of the present invention there is provided a method of controlling the filling of a media cassette for a self-service terminal (SST), the method comprising the steps:

providing a body defining a media-receiving area;

locating a member in the body to restrict the length of the area to a predetermined first dimension corresponding to a predetermined maximum length of media bundle;

locating a bundle of media in said area; and retracting the member to extend the length of the area to a larger second dimension and permitting longitudinal expansion of the media bundle therein.

These aspects of the invention are useful in preventing overfilling of the cassette, which may prevent media from being properly removed or picked from the cassette during a media-dispense operation. The initial location of the member prevents an operator from locating a bundle of media in the media-receiving area which is of greater dimension, that is a bundle which is "too long", and contains more media than the cassette is intended to accommodate. The ability to retract the member allows a bundle of media which has been tightly packed into the area to expand and thus facilitate reliable picking or removal of media from the bundle.

Preferably, the retraction of the member occurs following or in conjunction with the closing of the cassette. The member may be retracted manually, or in response to an operator action, but is preferably retracted automatically on the cassette being inserted in an SST, or on a lid being placed on the cassette. Most preferably, the member is adapted to be retracted by interaction of the member with a prong or other member provided in the SST and which engages with the cassette on insertion of the cassette into the SST. Conveniently, the member may interact with the prong or prongs as provided in many existing SSTs and which are utilized to retract the roller door provided at one end of the cassette and which provides access to the media for the SST pick arrangement.

The invention also relates to an SST incorporating or adapted to receive such cassettes as described above with reference to the various aspects of the invention.

BRIEF DESCRIPTION OF THE DRAWINGS

These and other aspects of the present invention will now be described, by way of example, with reference to the accompanying drawings, in which.

DETAILED DESCRIPTION

Figure 1:
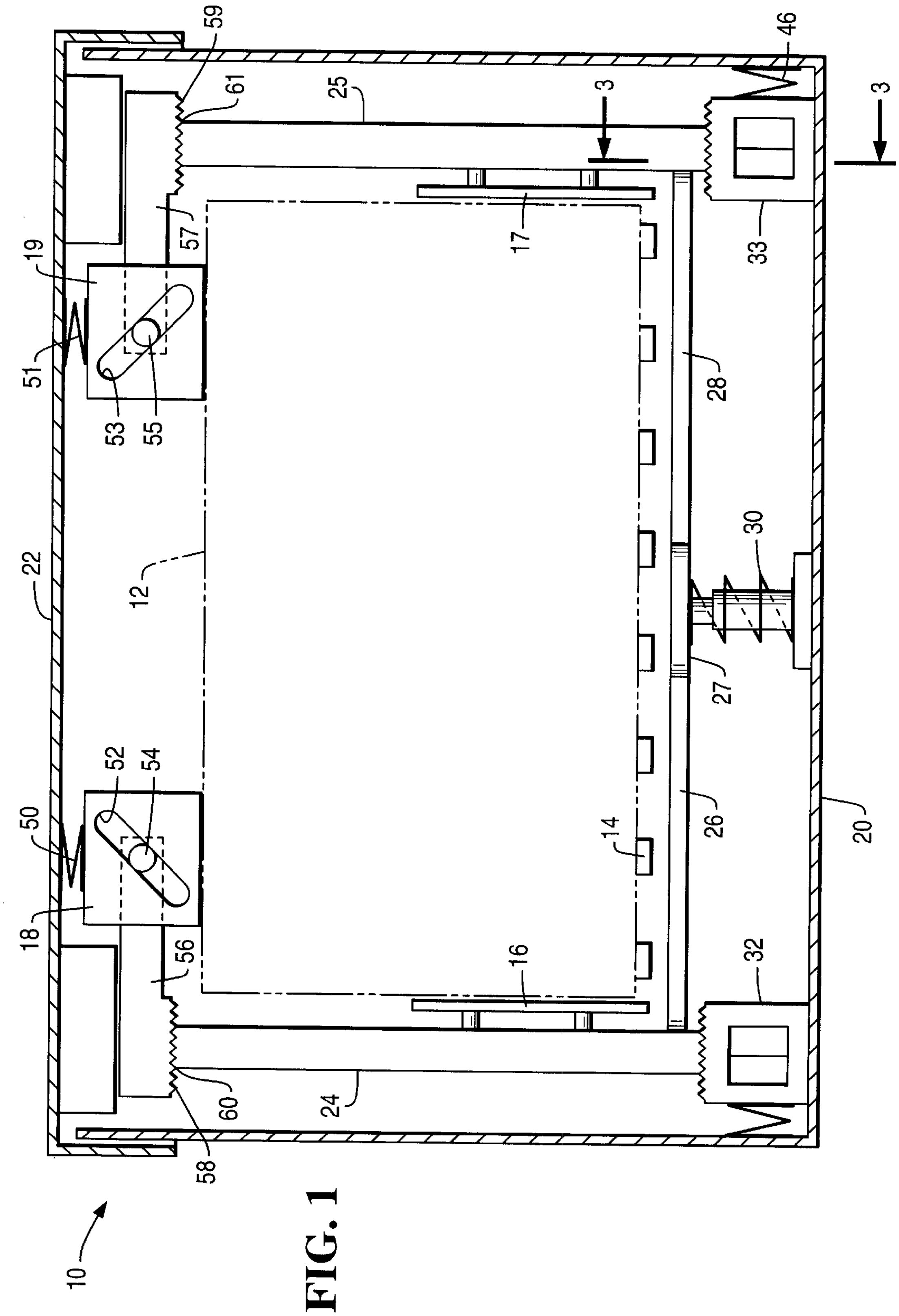
FIG. 1 is a diagrammatic sectional view of a currency cassette in accordance with an embodiment of one aspect of the present invention.

Reference is first made to FIG. 1 of the drawings, which is a diagrammatic sectional view of a currency cassette in accordance with an embodiment of one aspect of the present invention. The cassette is used in the storage and transport of banknotes between a secure central location and an automated teller machine (ATM), and once fitted within an ATM is arranged such that notes may be "picked" from the cassette 10 during dispense operations.

The banknotes are stored within the cassette in the form of a bundle 12, with the lower side face of the bundle 12, formed by the lower edges of the notes, supported by an appropriate track 14. Typically, a spring-urged pusher plate (not shown) urges the bundle towards the open end of the cassette 10 from which notes are removed as required.

As illustrated in FIG. 1, the bundle 12 is located by two width guides 16, 17 and two height guides 18, 19, as will be described. The width guides 16, 17 locate the side faces of the bundle, formed by the side edges of the banknotes, while the height guides 18, 19 locate the upper face of the bundle, formed by the upper edges of the banknotes.

The cassette 10 comprises an open-topped generally cuboid body 20 and a lid 22 which is securable to the body 20. The body and lid 20, 22 may be formed of any suitable material, such as a polycarbonate or an aluminum alloy. The body provides mounting for the track 14 on which the bundle of notes 12 sits, and also provides the mounting for the width guides 16, 17.

Figure 2:
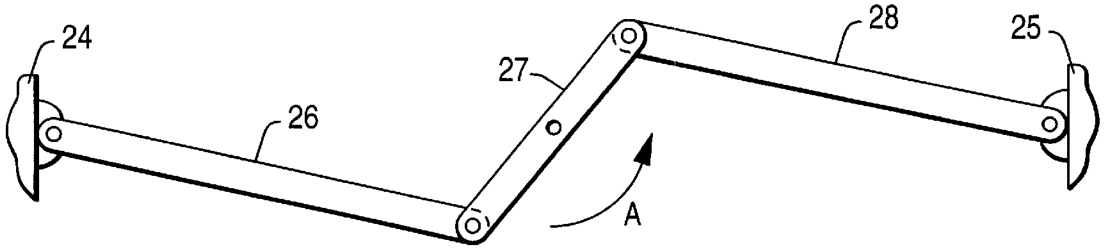
FIG. 2 is a plan view of an arrangement linking the width guides of the cassette of FIG. 1.

The width guides are mounted on respective vertical supports 24, 25, and which supports are linked by pinned members 26, 27, 28 extending beneath the track 14, and which members are also shown in plan view in FIG. 2 of the drawings. The central pinned member 27 is pivotally mounted to the base of the body 20, and is further coupled to a spring 30 which tends to lift the pinned members 26, 27, 28, and thus also the vertical supports 24, 25 and the width guides 16, 17. Further, the spring 30 also tends to rotate the member 27 in direction A, and thus tends to urge the width guides 16, 17 inwardly, to centralize the note bundle 12 within the cassette body 20.

Figure 3:
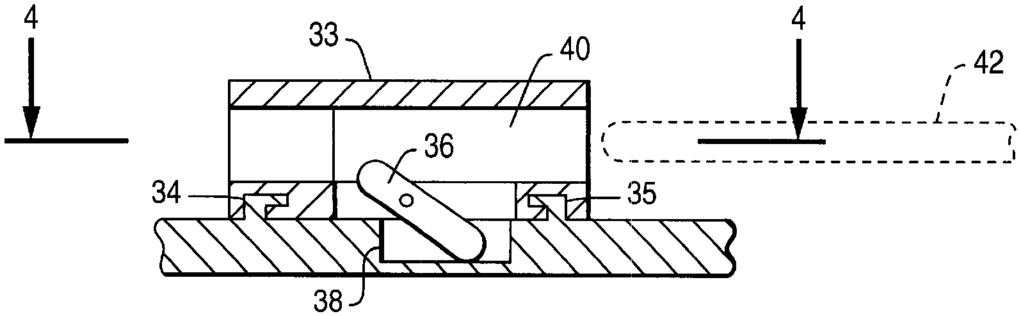
FIG. 3 is an enlarged sectional view on line 3—3 of FIG. 1.
Figure 4:
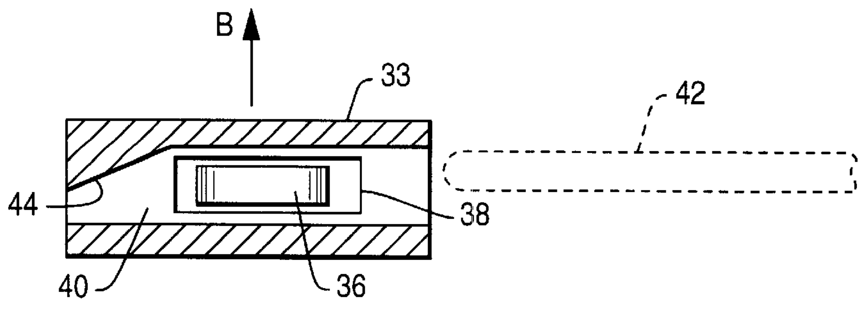
FIG. 4 is a sectional view on line 4—4 of FIG. 3.

The lower ends of the vertical supports 24, 25 define teeth for selectively co-operating with corresponding teeth provided on the upper surface of mirror image locking blocks 32, 33, further details of the block 33 being illustrated in FIGS. 3 and 4 of the drawings. The block 33 engages transverse rails 34, 35 extending from the base of the body, such that the block 33 is restricted to move transversely of the cassette body 20. However, the block 33 features a pivoting latch 36 which engages a slot 38 in the base of the body to lock the respective block relative to the body. The upper end of the latch 36 extends into a longitudinal channel 40 which is adapted to co-operate with a prong 42 (FIG. 3) provided on the SST into which the cassette 10 is to be fitted, such that as the cassette 10 is fitted in the SST the prong 42 passes through the channel 40 and releases the latch 36.

It will be noted from FIG. 4 that the end portion of one of the side walls of the channel 44 is angled: on the prong 42 passing through the channel 40, and engaging the side wall 44, the block is pushed in the direction B as illustrated in FIG. 4. Thus, on insertion of the cassette 10 into an SST, the block 33 is released and then pushed outwardly, against the action of a block return spring 46 (FIG. 1).

The height guides 18, 19 are in the form of blocks and are mounted via respective compression springs 50, 51 to the underside of the cassette lid 22. Each guide 18, 19 defines an inclined slot 52, 53 for co-operating with a respective pin follower 54, 55 mounted on a guide lock 56, 57. The slots 52, 53 are arranged such that movement of the guides 18, 19 towards the bundle 12 is accompanied by inward movement of the locks 56, 57 whereas outward movement of the locks 56, 57 causes the guides 18, 19 to be retracted, that is lifted away from the upper face of the bundle 12.

An outer downwardly facing portion of each lock 56, 57 defines a toothed surface 58, 59 for selectively co-operating with a respective corresponding toothed surface 60, 61 provided on the upper ends of the width guide vertical supports 24, 25.

To refill the cassette 10, the lid 22 is removed, which allows the spring 30 to lift the pinned members 26, 27, 28 and the vertical supports 24, 25 such that the supports 24, 25 are lifted clear of the locking blocks 32, 33. Thus, the width guides 16, 17 will tend to move inwardly towards one another. When an operator wishes to replace a bundle of notes in the cassette body 20, the operator may push one of the width guides 16, 17 outwardly, which also results in the other width guide moving outwardly to the same extent. If a bundle of notes is then placed on the track 14, and the width guide released, both width guides 16, 17 will move inwardly together to centralize the bundle 12 on the track 14. This ensures that the bundle 12 is correctly positioned within the cassette body 20. Once the cassette body 20 has been filled, the lid 22 is placed on the body 20, and as the lid 22 is moved downwardly the height guides 18, 19 will engage the upper face of the note bundle 12 and be pushed upwardly against the action of the springs 50, 51, this movement also causing the lock members 56, 57 to move inwardly. When the lid 22 is fully engaged with the body 20, the toothed surfaces 58, 59 of the lock members 56, 57 engage the upper toothed surfaces 60, 61 of the width guide vertical supports 24, 25. The contact between the lock members 56, 57 and the supports 24, 25 also causes the supports 24, 25 to move downwardly, against the action of the spring 30, and into engagement of the respective locking blocks 32, 33. As the locking blocks 32, 33 are latched to the base of the body 20, this results in both the width guides 16, 17 and the height guides 18, 19 being locked in position, in contact with the sides and upper face of the note bundle 12. Thus, as the filled cassette 10 is handled and transported, the integrity of the bundle 12 will be maintained, as very little if any movement of the bundle 12 will be permitted.

On inserting the filled cassette 10 into an appropriate SST, the cassette 10 will be slid into the SST such that the SST prongs 42 pass into the cassette body 20 and engage with the locking blocks 32, 33. As described above, as the prongs pass through the respective blocks 32, 33 the latches 36 are released and the blocks 32, 33 pushed outwardly. This movement of the blocks 32, 33 produces corresponding movement of the supports 24, 25, and thus moves the width guides 16, 17 away from the sides of the note bundles. Further, this movement is transferred from the supports 24, 25 to the lock members 56, 57 and, through the interaction of the pin followers 54, 55 with the slots 52, 53, the height guides 18, 19 are lifted from the upper face of the note bundle 12. The various guides are thus automatically retracted to provide the appropriate working clearance between the guides and the note bundle.

It will be evident to those of skill in the art that the above-described arrangement provides a currency cassette 10 with width and height guides which will automatically adjust to accommodate banknotes of a range of dimensions. Further, the ability to lock the guides facilitates safe transport and handling of the filled cassette. Of course, in the locked position the guides do not provide the desired working clearance between the guides and the note bundle 12, and this is provided automatically on insertion of the cassette 10 into the SST, through the interaction between the SST prongs and the locking blocks 32, 33.

Figure 5:
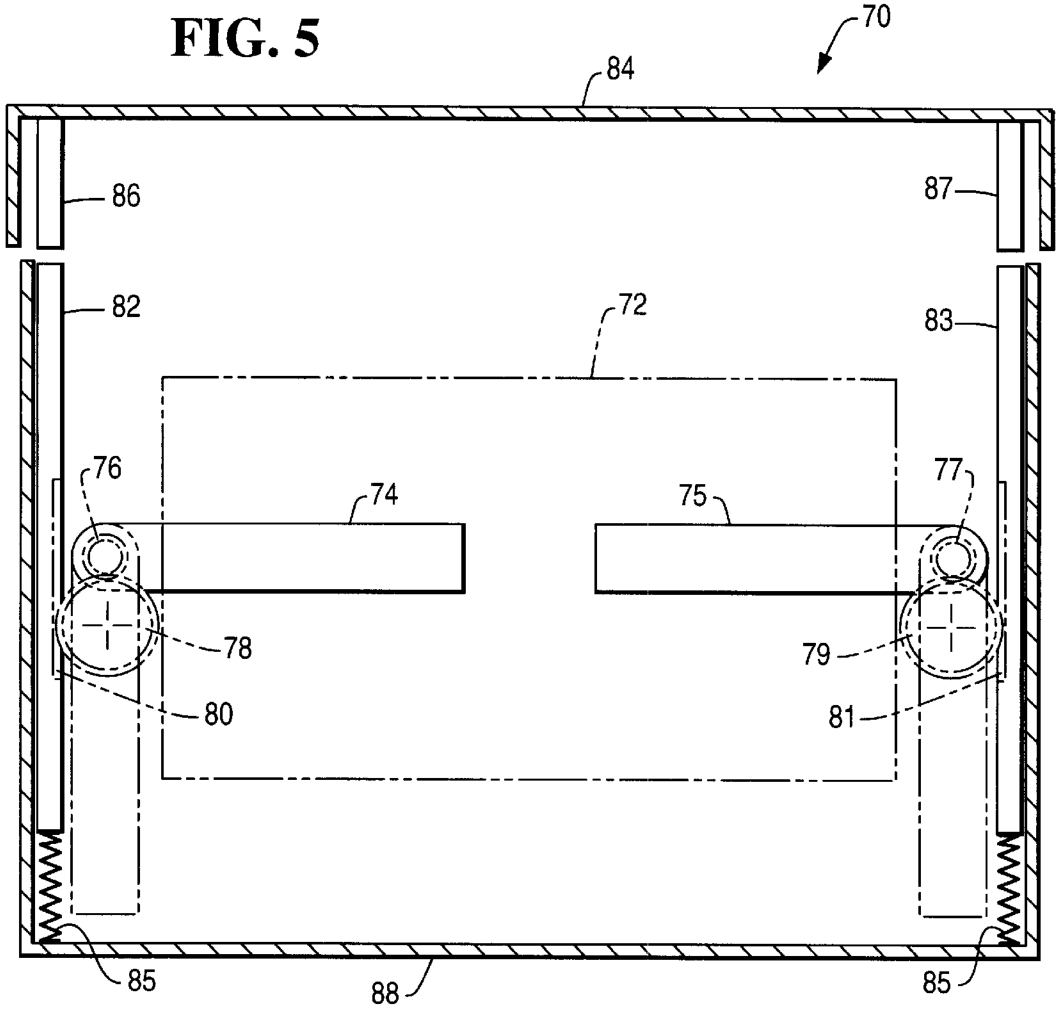
FIG. 5 is a diagrammatic sectional view of a currency cassette in accordance with an embodiment of a further aspect of the present invention.
Figure 6:
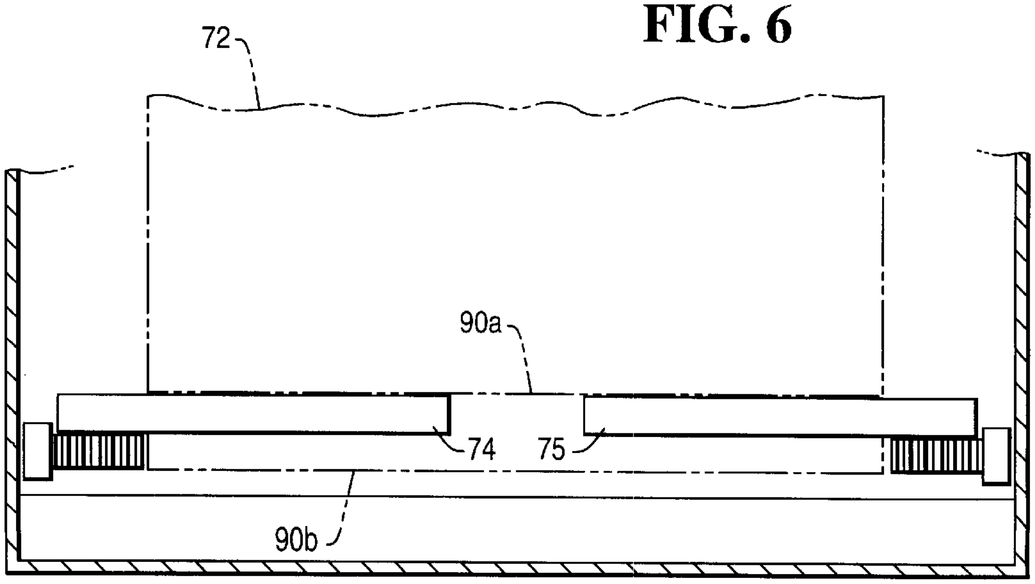
FIG. 6 is a plan view of a part of the currency cassette of FIG. 5.

Reference is now made to FIGS. 5 and 6 of the drawings, which are diagrammatic illustrations of a currency cassette 70 in accordance with a further aspect of the present invention. This aspect of the invention is intended to prevent or at least minimize the risk of over-filling of the cassette 70. This may occur when an operator places too many notes in a currency cassette, with the result that the note bundle 72 is too tightly packed, and it is difficult to pick notes from the end of the bundle once the cassette has been installed in an SST.

The over-filling prevention arrangement includes a pair of pivoting arms 74, 75 which, when extended, as illustrated in FIGS. 5 and 6, restrict the length of the note bundle 72 which may be placed in the cassette 70. The arms 74, 75 are located adjacent the end of the cassette 70 which is opened on insertion of the cassette 70 into an SST, and from which end the banknotes are picked from the note bundle 72. Each arm 74, 75 defines a small diameter toothed wheel 76, 77 which co-operates with a respective corresponding larger diameter toothed wheel 78, 79. Each larger toothed wheel 78, 79 engages a respective rack 80, 81 defined by a vertically extending rod 82, 83. Accordingly, downward movement of the vertical rods 82, 83 will result in retraction of the arms 74, 75 to the positions shown in chain dotted outlines, where the arms 74, 75 are clear of the end of the note bundle 72. The rods 82, 83 are mounted on respective compression springs 85, which tend to lift the rods 82, 83 and thus move the arms 74, 75 to the extended position.

The cassette lid 84 is provided with a pair of extensions 86, 87 which, when the lid 84 is placed on the cassette body 88, push the rods 82, 83 downwardly causing the arms 74, 75 to retract.

Thus, in use, when the cassette lid 84 is removed to allow refilling, the arms 74, 75 automatically assume the extended position, and define an end of the bundle receiving area of the cassette body 88. Once the cassette body has been filled, and the lid 84 secured to the body 88, the arms 74, 75 are retracted, allowing the bundle end face 90*a* to move a predetermined distance, for example 10 mm, forward to 90*b*, and ensuring that the notes in the bundle 72 are not too tightly packed to prevent picking of notes from the end of the bundle.

It will be apparent to those of skill in the art that the above-described embodiments are merely exemplary of the aspects of the invention, and that various modifications and improvements may be made thereto without departing from the scope of the invention.

What is claimed is:

1. A media cassette for a self-service terminal, the cassette comprising:

a cassette body for receiving media to be dispensed from the cassette, the received media collectively comprising media having at least two side edges, in a bundle having at least two end faces;

a movable first width guide member for locating the media within the body and for engaging a respective first side edge of the media in said bundle by moving towards said first side edge in order to hold the media bundle in a secure position; and a second width guide member for locating the media within the body and for engaging a respective second side edge of the media in said bundle; and means for urging the movable first width guide member towards said first side edge of the media in said bundle when the cassette is outside of the terminal; and means for urging the movable first width guide member to a position away from said first side edge of the media bundle when the cassette is inserted within the terminal, in order to provide a working clearance to allow dispensing of the media.

2. A cassette of claim 1, wherein said second width guide member is movable.

3. A cassette of claim 2, wherein the first and second movable width guide members are operatively associated such that a transverse movement of one width guide member produces a corresponding and opposite movement of the other width guide member.

4. A cassette of claim 1, including a height guide member for engaging an upper end face of the media bundle.

5. A cassette of claim 4, further comprising a lid which is securable to the body and to which the height guide member is mounted.

6. A cassette of claim 5, wherein the first movable width guide member is selectively lockable in position.

7. A cassette of claim 6, wherein the first movable width guide member is automatically locked in position on fitting the lid on the body.

8. A method of locating media in a cassette for storing media to be dispensed from a self-service terminal, the method comprising:

positioning a bundle of media in a body for receiving media to be dispensed; and urging a movable first width guide member towards a respective side edge of the media bundle to locate the bundle within the body, said movable first width guide member being retractable to a position away from the side edge of the media in said bundle upon insertion of the cassette into the self-service terminal in order to provide a working clearance to allow dispensing of the media, and said cassette having a second width guide member for locating the media within the body and for engaging a respective second side edge of the media in said bundle.

9. A media cassette for a self-service terminal, the cassette comprising:

a cassette body for receiving media to be dispensed and defining an area to receive a bundle of media, said bundle having at least two end faces; and a movable first height guide member mounted to the body and movable between a first position in which the movable first height guide member engages one of said end faces and thereby restricts the length of the media-receiving area to a first dimension which corresponds to a predetermined maximum allowable length of a media bundle during filling of the body and a second position achieved after completion of filling of the cassette in which the movable first height guide member permits the length of the media-receiving area to be extended to a second dimension greater than the predetermined maximum length of the media bundle to permit longitudinal expansion of a media bundle therein, said cassette having a second height guide member mounted to the body for locating the media within the body and for engaging a respective second end face of the media in said bundle, movement of the movable first height guide member to the second position serving to decrease pressure exerted by the movable first height guide member on said end face of the media bundle.

10. A cassette of claim 9, further comprising a lid which can be located on the body, the member being retractable automatically when the lid is located on the body.

11. A method of controlling the filling of a media cassette with a media bundle for a self-service terminal, the method comprising:

providing a body defining an area for receiving a bundle of media, said bundle having at least two end faces;

locating a movable first height guide member in the body to engage one of said end faces and thereby restrict a length of the area to a predetermined first dimension corresponding to a predetermined maximum allowable length of media bundle said cassette having a second height guide member mounted to the body for locating the media within the body and for-engaging a respective second end face of the media in said bundle;

locating said bundle of media in the area; and after locating the bundle of media in the area, retracting the movable first height guide member to extend the length of the area to a second dimension larger than the predetermined maximum allowable length of media bundle to reduce pressure exerted by the movable first height guide member on said end face of the media bundle and to permit longitudinal expansion of the media bundle in the area.

12. An automated teller machine (ATM) comprising:

a banknote cassette including (i) a cassette body for receiving banknotes to be dispensed in form of media having at least two side edges, in a bundle of banknotes having at least two end faces, (ii) a movable first width guide member for locating the banknotes within the body and for engaging a respective first side edge of the media in said banknote bundle, (iii) a second width guide member for locating the banknotes within the body and for engaging a respective second side edge of the media in said banknote bundle, (iv) means for urging the movable first width guide member towards said first side edge of the media in said banknote bundle when the cassette is outside of the terminal, and (v) means for urging the movable first width guide member to a position away from the media in said banknote bundle when the cassette is inserted within the terminal, in order to provide a working clearance to allow dispensing of the banknotes; and a picker mechanism for picking banknotes from the banknote cassette for dispensing the picked banknotes to an ATM customer.

13. An ATM of claim 12, wherein the second width guide member is movable.

14. An ATM of claim 13, wherein the first and second movable width guide members are operatively associated such that a transverse movement of one movable width guide member produces a corresponding and opposite movement of the other movable width guide member.

15. An ATM of claim 12, including a height guide member for engaging an upper end face of the banknote bundle.

16. An ATM of claim 15, further comprising a lid which is securable to the body and to which the height guide member is mounted.

17. An ATM of claim 16, wherein the first movable width guide member is selectively lockable in position.

18. An ATM of claim 17, wherein the first movable width guide member is automatically locked in position on fitting the lid on the body.

* * * * *